United States Patent
Siva et al.

(10) Patent No.: US 12,242,857 B1
(45) Date of Patent: Mar. 4, 2025

(54) SYSTEM AND METHOD FOR GENERATING MULTIPLE PLATFORM-DEPENDENT INSTRUCTION SETS FROM SINGLE HARDWARE SPECIFICATION

(71) Applicant: Marvell Asia Pte Ltd, Singapore (SG)

(72) Inventors: Nimalan Siva, San Ramon, CA (US); Nikita Goyal, San Jose, CA (US); Ankit Anand, Newark, CA (US); Soumya Gollamudi, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 127 days.

(21) Appl. No.: 17/961,888

(22) Filed: Oct. 7, 2022

Related U.S. Application Data

(60) Provisional application No. 63/395,356, filed on Aug. 5, 2022.

(51) Int. Cl.
  *G06F 9/38* (2018.01)
  *G06F 8/41* (2018.01)
  *G06F 8/76* (2018.01)

(52) U.S. Cl.
  CPC .............. *G06F 9/3888* (2023.08); *G06F 8/41* (2013.01); *G06F 8/76* (2013.01)

(58) Field of Classification Search
  None
  See application file for complete search history.

(56) References Cited

U.S. PATENT DOCUMENTS

| | | | |
|---|---|---|---|
| 8,418,125 B2 * | 4/2013 | Hawkins | G06F 9/4494 717/136 |
| 8,516,435 B2 * | 8/2013 | Akkiraju | G06F 8/10 717/162 |

(Continued)

FOREIGN PATENT DOCUMENTS

| | | | | |
|---|---|---|---|---|
| CA | 3201566 A1 * | 6/2022 | | G06F 11/3013 |

OTHER PUBLICATIONS

'Improving Platform Independent Graphical Performance by Compressing Information Transfer using JSON' by T.H. McMullen et al., Apr. 2013. (Year: 2013).*

(Continued)

*Primary Examiner* — Steven G Snyder

(57) ABSTRACT

A new approach of systems and methods to support automatic generation of multiple platform-dependent instruction sets from a single specification of an integrated circuit (IC). First, a specification compiler accepts as input a first instruction set of a plurality of first instructions in a specification format, wherein the first instruction set defines a design pattern of one or more specifications and/or requirements of the IC and is independent of any implementation or platform of the IC. The design tool then converts the first instruction set into a second instruction set of a plurality of second instructions in an intermediate format. A language compiler then accepts and compiles the second instruction set into a plurality of third instruction sets, wherein each of the plurality of third instruction sets comprises a plurality of third instructions in a specific language for a specific platform targeting a specific implementation or application of the IC.

27 Claims, 6 Drawing Sheets

(56) References Cited

U.S. PATENT DOCUMENTS

| | | | | |
|---|---|---|---|---|
| 8,712,947 | B2* | 4/2014 | Shanmukh | G06F 8/74 |
| | | | | 706/46 |
| 9,250,900 | B1* | 2/2016 | Kim | G06F 15/76 |
| 10,204,253 | B1* | 2/2019 | Long | G07G 1/0045 |
| 10,228,674 | B2* | 3/2019 | Bruck | G05B 19/052 |
| 10,990,736 | B1* | 4/2021 | Dudha | G06F 30/327 |
| 11,513,818 | B1* | 11/2022 | Chen | G06F 9/44521 |
| 2006/0101369 | A1* | 5/2006 | Wang | G06F 30/30 |
| | | | | 712/E9.028 |
| 2008/0276229 | A1* | 11/2008 | Hawkins | G06F 8/10 |
| | | | | 717/136 |
| 2009/0319981 | A1* | 12/2009 | Akkiraju | G06F 8/10 |
| | | | | 717/104 |
| 2010/0199257 | A1* | 8/2010 | Biggerstaff | G06F 8/456 |
| | | | | 717/110 |
| 2012/0197832 | A1* | 8/2012 | Shanmukh | G06Q 10/101 |
| | | | | 706/46 |
| 2016/0224001 | A1* | 8/2016 | Bruck | G05B 19/052 |
| 2016/0371081 | A1* | 12/2016 | Powers | G06F 9/45504 |
| 2022/0083740 | A1* | 3/2022 | von der Heyde | G06F 40/30 |
| 2022/0334809 | A1* | 10/2022 | Stone | G06F 16/958 |

OTHER PUBLICATIONS

'C++ Encapsulation and Getters and Setters' by W3 Schools, archived on Aug. 15, 2022. (Year: 2022).*

'Hardware Design for Machine Learning' by Pooja Jawandhiya, International Journal of Artificial Intelligence and Applications (IJAIA), vol. 9, No. 1, Jan. 2018. (Year: 2018).*

'A Model for Web developer to overcome the Cross Platform Dependency in Mobile Technologies' by Rehana Sharif et al., International Journal of Advanced Research in Computer Science and Electronics Engineering (IJARCSEE) vol. 2, Issue 1, Jan. 2013. (Year: 2013).*

'A Compilation- and Simulation-Oriented Architecture Description Language for Multicore Systems' by Timo Stripf et al., 2012 IEEE 15th International Conference on Computational Science and Engineering. (Year: 2012).*

* cited by examiner

Set of ISA Instructions | Various fields of each ISA instruction

| Instruction bit assignment | | | field1 Bits (8 bits) | | | | | | field2(32 bits) | | | | |
|---|---|---|---|---|---|---|---|---|---|---|---|---|---|
| ISA1 | 127 | 126 | 125 | 124 | 123 | 122 | 121 | 120 | 117 | 116 | 115 | 114 | 113 | 112 |
| field1(8),field2(32),field3(6) | R | R | 0 | 1 | 0 | 0 | 0 | 0 | | | | | | |
| Instruction bit assignment | | | field1 Bits (8 bits) | | | | | | field2(32 bits) | | | | |
| ISA2 | 127 | 126 | 125 | 124 | 123 | 122 | 121 | 120 | 117 | 116 | 115 | 114 | 113 | 112 |
| field1(8),field2(32) | R | R | 0 | 1 | 0 | 0 | 1 | 0 | | | | | | |
| Instruction bit assignment | | | field1 Bits (8 bits) | | | | | | field2(6 bits) | | | | |
| ISA3 | 127 | 126 | 125 | 124 | 123 | 122 | 121 | 120 | 117 | 116 | 115 | 114 | 113 | 112 |
| field1(8),field2(6),field3(6),field4(4) | R | R | 0 | 1 | 0 | 1 | 0 | 0 | | | | | | |

FIG. 2A

```
{
    "HAS" : "0.1",
    "input_file": "ISA-encoding.xlsx",
    "all_instructions": {
        "1.0": {
            "instruction": "ISA1",
            "category": "DMA-Instructions",
            "total_bits": 125,
            "bitwise": "[R,R,0,0,0,1,0,0,0,0,0,0.................R,R,R]",
            "bit_assignment": [
                {
                    "operand":"field1",
                    "length": 8,
                    "range_of_bits": "[127:120]"
                },
                {
                    "operand": "field2",
                    "length" : 32,
                    "range_of_bits" : "[119:88]"
                },
```

FIG. 2B

```
class ${class_name} extends MlInstrBase;

${class_members}
    function new ();
        ${instr_type}   = ml_isa_defs::${ins_type};
        Instr_category  = ${instr_category};
        Opcode          = ${get_opcode} (${instr_type});
    endfunction
```

↓ Template used for compilation

```
class isa1 extends MlInstrBase;

rand bit[127:120]   field1;
    rand bit[119:86]    field2;
    rand bit[85:0]      reserved;

function new();
        instr_type      = ml_isa_defs::DMA
        instr_category  = DMA;
        opcode          = get_opcode(instr_type);
    endfunction function void pack();
        val    = {field1, field2, reserved};
    endfunction function void unpack();
        {field1, field2, reserved} = val;
    endfunction
```

Class for design verification

FIG. 2C

```
ml_isa_defs::ARG_ISA1_S            var1;
ml_isa_defs::ARG_ISA2_S            var2;
ml_isa_defs::ARG_ISA3_S            var3;
ml_isa_defs::ARG_ISA1_S            var4;

var1.field1 = 0;
var2.field1 = 0;
var3.field1 = 0;
if(var1.field == 1) begin
        var1.field3 = var3.field3;
end
```

FIG. 2D

```
class isa1InstructionToken: public InstructionToken {
public:
        isa1InstructionToken() {
                field1 = 0;
                field2 = 0;
                field3 = 0;
        }

~isa1InstructionToken() {};
public:
        std::uint64_t field1;
        std::uint64_t field2;
        std::uint64_t field3;
};
```

FIG. 2E

```
#include <bitset>

IsaParser::IsaParser() {
        m_pInterpreter = new InstructionInterpreter();
        m_pIsaOpcode = new IsaOpcode();
}

IsaParser::~IsaParser()
{
        delete m_pInterpreter;
        delete m_pIsaOpcode;
} std::vector<packedInstructionFormat> IsaParser::ParseBinaryFile(std::string fil std::vector<PackedInstructionFormat> res;

std::ifstream file_in;
        file_in.open(file);
```

FIG. 3

SYSTEM AND METHOD FOR GENERATING MULTIPLE PLATFORM-DEPENDENT INSTRUCTION SETS FROM SINGLE HARDWARE SPECIFICATION

CROSS-REFERENCE TO RELATED APPLICATIONS

This application claims the benefit of U.S. Provisional Patent Application No. 63/395,356, filed Aug. 5, 2022, which is incorporated herein in its entirety by reference.

BACKGROUND

An electronic hardware, which, for a non-limiting example, can be but is not limited to an integrated circuit (IC), can be defined and specified using multiple instruction sets of a plurality of software instructions, e.g., source code and/or libraries in different languages on different platforms to serve different purposes. Here, the IC can be but is not limited to a processor such as CPU or GPU, or an application-specific IC (ASIC). For a non-limiting example, an instruction set in hardware specification language such as Verilog or VHDL can be used to define and specify hardware of the IC at resistor-transistor level (RTL). For another non-limiting example, another instruction set in design verification language such as System Verilog (SV) can be used to verify various functionalities of the IC. For another non-limiting example, another instruction set in a programming language such as C++ can be used to emulate or simulate one or more test benches of the IC. For another non-limiting example, another instruction set in programming language such as C or C++ can be used for software to be compiled and executed by the IC. In some embodiments, each instruction set can be of any type of a high level programming language. In some embodiments, each instruction set can be of any type of an intermediate level programming language.

Currently, a designer of the IC often needs to generate the different instruction sets in different languages and/or on different platforms discussed above manually using different tools/scripts, which can be time-consuming and may cause inconsistencies among the different instruction sets. In some cases, helper and other utility functions such as those used to pack and unpack various fields of an instruction to alleviate manual creation of the instruction sets are typically handwritten and are prone to errors.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2A depicts a non-limiting example of a first instruction set in ISA format that is provided to and accepted as an Excel spreadsheet according to an aspect of a present embodiment.

FIG. 2B depicts a non-limiting example of the second instruction set in JSON format, which is converted from the example of the first instruction set of ISA instructions in FIG. 2A according to an aspect of a present embodiment.

FIG. 2C depicts a non-limiting example of a third instruction set of a class for design verification in System Verilog, which is compiled from the example of the second instruction set of in JSON as shown in FIG. 2B according to an aspect of a present embodiment.

FIG. 2D depicts a non-limiting example of a third instruction set in Verilog compiled from the example of the second instruction set of in JSON as shown in FIG. 2B for RTL design of the example of the ISA instruction in FIG. 2A according to an aspect of a present embodiment.

FIG. 2E depicts a non-limiting example of a third instruction set in C++ compiled from the example of the second instruction set of in JSON as shown in FIG. 2B for testing and emulation of the example of the ISA instruction in FIG. 2A according to an aspect of a present embodiment.

FIG. 3 depicts a non-limiting example of a software instruction set in C++ language for parsing the example of the ISA instruction according to an aspect of a present embodiment.

DETAILED DESCRIPTION

Figure 1:
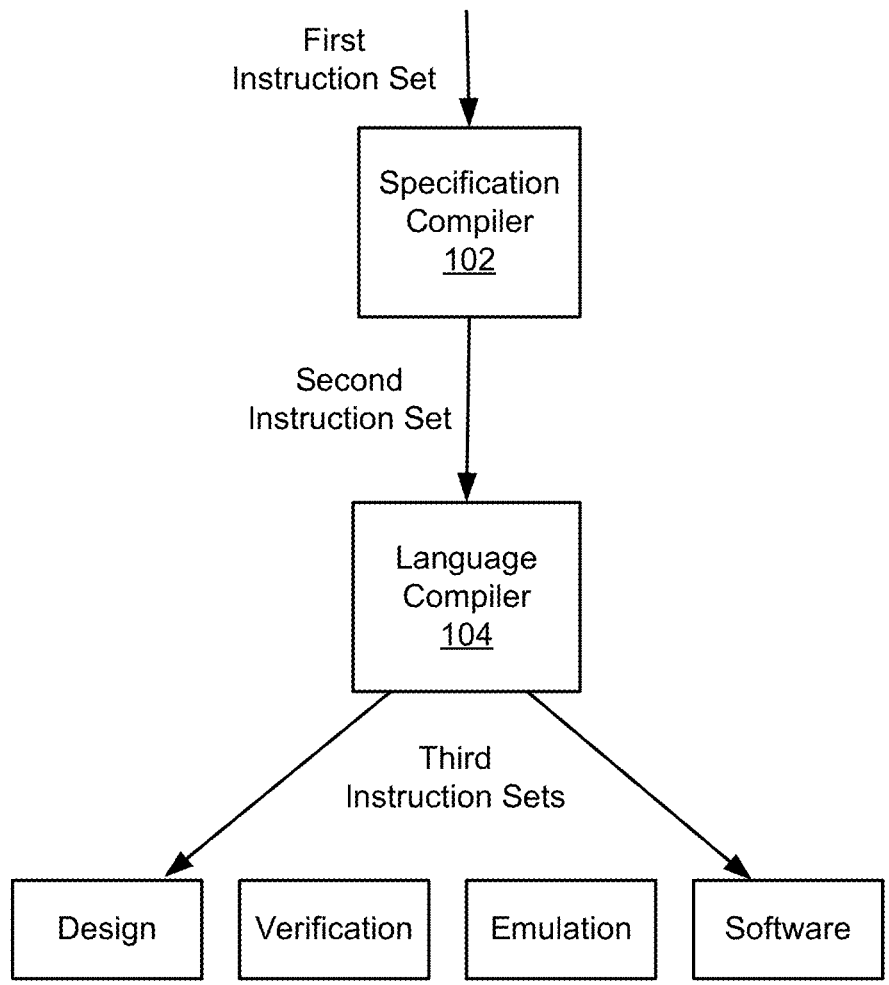
FIG. 1 depicts an example of a diagram to support multiple instruction set generation from a single specification according to an aspect of a present embodiment.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed to support automatic generation of multiple platform-dependent instruction sets from a single specification of an integrated circuit (IC). First, an infrastructure/specification compiler is configured to accept as input a first instruction set of a plurality of first instructions in a specification format, wherein the first instruction set defines a design pattern of one or more specifications and/or requirements of the IC and is independent of any implementation or platform of the IC. The design tool then converts the first instruction set into a second instruction set of a plurality of second instructions in an intermediate format. A language compiler then accepts and compiles the second instruction set into a plurality of third instruction sets, wherein each of the plurality of third instruction sets comprises a plurality of third instructions in a specific language for a specific platform targeting a specific implementation or application of the IC. Here, the implementation or application of the IC can be but is not limited to, RTL design, design verification, testing, emulation, and software functionalities of the IC.

Under the proposed approach, a single definition/specification of an IC can be compiled into multiple instruction sets in different languages on different platforms or applications of the IC including but not limited to, RTL design, design verification, testing, emulation, software collaterals, etc. As a result, all development efforts are in sync with respect to the original specification of the IC. Since the proposed approach eliminates the need to generate the multiple languages for different platforms or implementations independent of each other, the potential scope of errors with respect to the multiple languages is reduced. In addition, the proposed approach is configured to generate and provide utility and helper functions, which can be utilized to significantly save time and improve accuracy of the multiple instruction sets generated.

FIG. 1 depicts an example of a diagram of a system 100 to support multiple instruction set generation from a single specification. Although the diagrams depict components as functionally separate, such depiction is merely for illustrative purposes. It will be apparent that the components portrayed in this figure can be arbitrarily combined or divided into separate software, firmware, and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a specification compiler 102 and a language compiler 104. Each of the compilers in the system 100 runs on one or more computing units or devices (not shown) each with software instructions stored in a storage unit such as a non-volatile memory of the computing unit for practicing one or more processes. When the software instructions are executed, at least a subset of the software instructions is loaded into memory by one of the computing units, which becomes a special purposed one for practicing the processes. The processes may also be at least partially embodied in the computing units into which computer program code is loaded and/or executed, such that, the computing units become special purpose computing units for practicing the processes.

In the example of FIG. 1, the specification compiler 102 is configured to accept a first instruction set having a plurality of first instructions in a specification format as input, wherein the first instruction set defines a design pattern including one or more of specifications and/or requirements of an IC to be designed, verified, and tested/emulated. Here, the first instruction set representing the design pattern of the IC is independent of any language, implementation, and/or platform of the IC. In some embodiments, the first instruction set is specified in the format of instruction set architecture (ISA) designed for, for a non-limiting example, a specialized machine learning (ML) hardware and/or efficient data processing for ML operations. In some embodiments, the ISA may cover one or more of different addressing modes, native data types, registers, memory architectures, and interrupts. In some embodiments, the ISA is a predominantly asynchronous instruction set, wherein each instruction in the ISA format programs a state-machine, which then runs asynchronously with respect to other state machines. In some embodiments, the ISA provides separate synchronizing instructions to ensure order between instructions where needed. In some embodiments, when being executed on an ML hardware, the first instruction set in the ISA format is configured to perform one or more of: (i) programming one or more input data streams to the ML hardware; (ii) programming one or more operations to be performed on the input data streams; and (iii) programming one or more output data streams from the ML hardware. In some embodiments, the specification compiler 102 is configured to accept the first instruction set in ISA format as an input file, e.g., an Excel spreadsheet. FIG. 2A depicts a non-limiting example of a first instruction set in ISA format that is provided to and accepted by the specification compiler 102 as an Excel spreadsheet. As shown by the example of FIG. 2A, the set of ISA instructions specify one or more operations to be performed by the ML hardware, wherein each ISA instruction includes Field 1 of, e.g., 8-bits and Field 2 of, e.g., 22-bits.

In the example of FIG. 1, the specification compiler 102 is configured to convert the accepted first instruction set into a second instruction set of a plurality of second instructions in an intermediate/second format, wherein the second instruction set in the intermediate format represents the same design pattern of the IC as the first instruction set and can be utilized by the language compiler 104 to generate multiple third instruction sets in different languages for different platforms and/or implementations. In some embodiments, the specification compiler 102 is configured to parse one or more fields of each first instruction in the first instruction set, e.g., Field 1 and Field 2 of an ISA instruction, in order to convert the each first instruction into one or more second instructions in the second instruction set.

In some embodiments, the intermediate format can be JavaScript Object Notation (JSON) format, which is an open standard file and data interchange format that uses human-readable text to store and transmit data objects consisting of attribute-value pairs and arrays (or other serializable values). It is a common data format with diverse uses in electronic data interchange. Note that JSON is a language-independent data format derived from JavaScript, and a programming language compiler such as the language compiler 104 can parse instructions in JSON format. FIG. 2B depicts a non-limiting example of the second instruction set in JSON format, which is converted from the example of the first instruction set of ISA instructions in FIG. 2A. In some embodiments, the specification compiler 102 is configured to convert the one or more fields of the each first instruction in the first instruction set to a corresponding instruction structure/template in JSON format. For a non-limiting example, the ISA instruction as shown in FIG. 2A is converted to a corresponding instruction structure/template in JSON in FIG. 2B, wherein the instruction structure/template in JSON also includes a bit assignment for the 8-bit Field 1 (e.g., [127:120]) as specified in by the ISA instruction in FIG. 2A.

In the example of FIG. 1, once the first instruction set has been converted into the second instruction set in the intermediate format by the specification compiler 102, the language compiler 104 is configured to accept and compile the second instruction set in the intermediate format into a plurality of third instruction sets each having a plurality of third instructions/source code/libraries in a specific language targeting a specific platform, implementation, and/or application of the IC. Here, the different platforms, implementations, and/or applications targeted by the plurality of language-dependent third instruction sets include but are not limited to, RTL design, design verification, emulation and testing, and software of the IC. The programming languages used by the plurality of third instruction sets include but are not limited to, C, C++, Verilog, and System Verilog. In some embodiments, each of the programming languages used can be either a high level programming language or an intermediate level programming language. In some embodiments, the language compiler 104 is configured to create and utilize a template specific to a language to convert/compile the second instruction set in the intermediate format into a third instruction set of the plurality of third instructions/source code in that specific language. Here, the language-specific template binds/maps context of each of one or more fields in the instruction structure of the intermediate format (e.g., JSON) to the specific source code language (e.g., C) used by the platform (e.g., for RTL design or verification). FIG. 2C depicts a non-limiting example of the third instruction set of a class in System Verilog language for design verification, which is compiled from the example of the second instruction set in JSON as shown in FIG. 2B. As shown by the example of FIG. 2C, a template that defines a class for design verification in System Verilog language is utilized by the language compiler 104 to compile the example of the second instruction set in JSON as shown in FIG. 2B to the third instruction set of a class in System Verilog language for design verification. Note that the language compiler 104 is configured to compile the same second instruction set in JSON format into the plurality of third instruction sets in different languages for different platforms. For non-limiting examples, FIG. 2D depicts a non-limiting example of a third instruction set for RTL structs in Verilog language compiled from the example of the second instruction set in JSON as shown in FIG. 2B for RTL design of the example of the ISA instruction for matrix multiplication depicted in FIG. 2A. FIG. 2E depicts a non-limiting example of a third instruction set in C++ language compiled from the example of the second instruction set of in JSON as shown in FIG. 2B for testing and emulation of the example of the ISA instruction for matrix multiplication.

In some embodiments, the language compiler 104 is configured to provide one or more utility/helper functions in one or more languages for parsing one or more fields of each of the plurality of first and/or second instructions in the first and/or second instruction set. In some embodiments, the language compiler 104 is configured to create an unpack function to de-construct an instruction into the one or more fields, and a pack function to construct the de-constructed one or more fields back together as the instruction. In some embodiments, the language compiler 104 is configured to create a setter function to set values for each of the one or more fields of an instruction, and a getter function to retrieve values from each of the one or more fields of the instruction. FIG. 3 depicts a non-limiting example of a software instruction set in C++ language for parsing the example of the ISA instruction.

Figure 4:
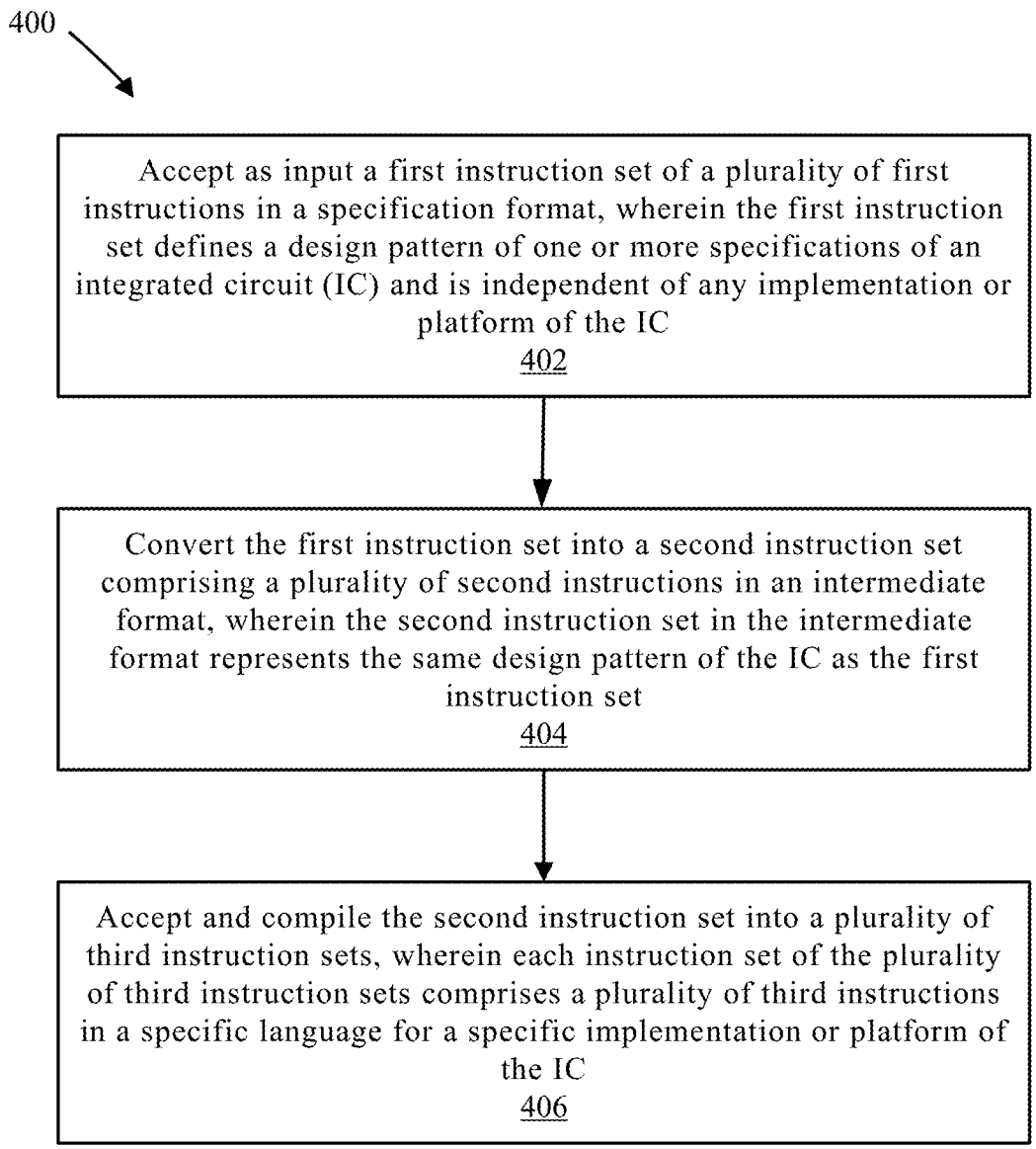
FIG. 4 depicts a flowchart of an example of a process to support multiple instruction set generation from a single specification according to an aspect of a present embodiment.

FIG. 4 depicts a flowchart 400 of an example of a process to support multiple instruction set generation from a single specification. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 4, the flowchart 400 starts at block 402, where a first instruction set of a plurality of first instructions in a specification format is accepted as input, wherein the first instruction set defines a design pattern of one or more specifications of an integrated circuit (IC) and is independent of any implementation or platform of the IC. The flowchart 400 continues to block 404, where the first instruction set is converted into a second instruction set comprising a plurality of second instructions in an intermediate format, wherein the second instruction set in the intermediate format represents the same design pattern of the IC as the first instruction set. The flowchart 400 ends at block 406, where the second instruction set is accepted and compiled into a plurality of third instruction sets, wherein each instruction set of the plurality of third instruction sets comprises a plurality of third instructions in a specific language for a specific implementation or platform of the IC.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system to support multiple instruction set generation from a single specification of an integrated circuit (IC), comprising:
   a specification compiler configured to
      accept as input a first instruction set of a plurality of first instructions in a specification format, wherein the first instruction set defines a design pattern of one or more specifications of the IC and is independent of any implementation or platform of the IC;
      convert the first instruction set into a second instruction set comprising a plurality of second instructions in an intermediate format, wherein the second instruction set in the intermediate format represents the same design pattern of the IC as the first instruction set; and
   a language compiler configured to accept and compile the second instruction set into a plurality of third instruction sets using a template specific to a language to compile for a specific implantation or platform of the IC, wherein each instruction set of the plurality of third instruction sets comprises a plurality of third instructions in the specific language, and wherein the template specific to the language maps context of one or more fields in the intermediate format to the specific language.

2. The system of claim 1, wherein:
   the specific implementation or platform of the IC is one of resistor-transistor level (RTL) design, design verification, testing, emulation, and software.

3. The system of claim 1, wherein:
   the first instruction set is in the format of instruction set architecture (ISA) designed for a specialized machine learning (ML) hardware and/or efficient data processing for ML operations.

4. The system of claim 3, wherein:
   the first instruction set in the ISA format is configured to perform one or more of: (i) programming one or more input data streams to the ML hardware; (ii) programming one or more operations to be performed on the input data streams; and (iii) programming one or more output data streams from the ML hardware, when being executed on the ML hardware.

5. The system of claim 3, wherein:
   the specification compiler is configured to accept the first instruction set in ISA format as an input file.

6. The system of claim 1, wherein:
   each first instruction in the first instruction set has one or more fields.

7. The system of claim 6, wherein:
the specification compiler is configured to parse the one or more fields of the each first instruction in the first instruction set in order to convert the each first instruction set in one or more second instructions in the second instruction set.

8. The system of claim 1, wherein:
the intermediate format is JavaScript Object Notation (JSON) format.

9. The system of claim 8, wherein:
the specification compiler is configured to convert one or more fields of each first instruction in the first instruction set to a corresponding instruction structure in JSON format.

10. The system of claim 1, wherein:
the language used by the each of the plurality of third instruction sets is one or more of C, C++, Verilog, and System Verilog.

11. The system of claim 1, wherein:
the language compiler is configured to create template specific to the language to compile the second instruction set in the intermediate format into the each of the third instruction sets of the plurality of third instructions in the specific language.

12. The system of claim 11, wherein:
the language-specific template binds context of each of one or more fields in the intermediate format to the specific language.

13. The system of claim 1, wherein:
the language compiler is configured to provide one or more utility functions in one or more languages for parsing one or more fields of each of the plurality of first and/or second instructions in the first and/or second instruction set.

14. The system of claim 13, wherein:
the language compiler is configured to create an unpack function to de-construct an instruction into the one or more fields and a pack function to construct the de-constructed one or more fields back together as the instruction.

15. The system of claim 13, wherein:
the language compiler is configured to create a setter function to set values for each of the one or more fields of an instruction and a getter function to retrieve values from each of the one or more fields of the instruction.

16. A method to support multiple instruction set generation from a single specification of an integrated circuit (IC), comprising:
accepting as input a first instruction set of a plurality of first instructions in a specification format, wherein the first instruction set defines a design pattern of one or more specifications of the IC and is independent of any implementation or platform of the IC;
converting the first instruction set into a second instruction set comprising a plurality of second instructions in an intermediate format, wherein the second instruction set in the intermediate format represents the same design pattern of the IC as the first instruction set;
accepting and compiling the second instruction set into a plurality of third instruction sets using a template specific to a language to compile for a specific implantation or platform of the IC, wherein each instruction set of the plurality of third instruction sets comprises a plurality of third instructions in the specific language, and wherein the template specific to the language maps context of one or more fields in the intermediate format to the specific language.

17. The method of claim 16, wherein:
the specific implementation or platform of the IC is one of resistor-transistor level (RTL) design, design verification, testing, emulation, and software.

18. The method of claim 16, wherein:
the first instruction set is in the format of instruction set architecture (ISA) designed for a specialized machine learning (ML) hardware and/or efficient data processing for ML operations.

19. The method of claim 18, further comprising:
executing the first instruction set in the ISA format on the ML hardware to perform one or more of: (i) programming one or more input data streams to the ML hardware; (ii) programming one or more operations to be performed on the input data streams; and (iii) programming one or more output data streams from the ML hardware, when being executed.

20. The method of claim 18, further comprising:
accepting the first instruction set in ISA format as an input file.

21. The method of claim 16, further comprising:
parsing the one or more fields of the each first instruction in the first instruction set in order to convert the each first instruction into one or more second instructions in the second instruction set.

22. The method of claim 16, further comprising:
converting one or more fields of each first instruction in the first instruction set to a corresponding instruction structure in JSON format.

23. The method of claim 16, further comprising:
creating the template specific to the language to compile the second instruction set in the intermediate format into the each of the third instruction sets of the plurality of third instructions in the specific language.

24. The method of claim 16, further comprising:
providing one or more utility functions in one or more languages for parsing one or more fields of each of the plurality of first and/or second instructions in the first and/or second instruction set.

25. The method of claim 24, further comprising:
creating an unpack function to de-construct an instruction into the one or more fields and a pack function to construct the de-constructed one or more fields back together as the instruction.

26. The method of claim 24, further comprising:
creating a setter function to set values for each of the one or more fields of an instruction and a getter function to retrieve values from each of the one or more fields of the instruction.

27. A system to support multiple instruction set generation from a single specification of an integrated circuit (IC), comprising:
a means for accepting as input a first instruction set of a plurality of first instructions in a specification format, wherein the first instruction set defines a design pattern of one or more specifications of the IC and is independent of any implementation or platform of the IC;
a means for converting the first instruction set into a second instruction set comprising a plurality of second instructions in an intermediate format, wherein the second instruction set in the intermediate format represents the same design pattern of the IC as the first instruction set;
a means for accepting and compiling the second instruction set into a plurality of third instruction sets using a template specific to a language to compile for a specific implantation or platform of the IC, wherein each instruction set of the plurality of third instruction sets comprises a plurality of third instructions in the specific language, and wherein the template specific to the language maps context of one or more fields in the intermediate format to the specific language.

* * * * *